United States Patent
Sharan et al.

(10) Patent No.: US 7,656,877 B1
(45) Date of Patent: Feb. 2, 2010

(54) APPARATUS AND METHODS FOR SNIFFING DATA IN A CABLE HEAD END

(75) Inventors: Ishita Sharan, Santa Clara, CA (US); Feisal Y. Daruwalla, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 795 days.

(21) Appl. No.: 09/935,238

(22) Filed: Aug. 21, 2001

(51) Int. Cl.
*H04H 20/28* (2008.01)
*H04L 12/28* (2006.01)
*H04N 7/173* (2006.01)
*G06F 15/16* (2006.01)

(52) U.S. Cl. ............... 370/395.2; 370/487; 725/97; 725/105; 709/232

(58) Field of Classification Search ......... 370/229–231, 370/235, 401, 485–488, 351–356, 420–421, 370/248–252, 389, 468, 395.21, 390, 431, 370/432, 410, 400, 465, 395.2, 329, 395.4, 370/419, 412, 429, 426, 428; 455/69, 574; 709/225, 227, 226; 725/91, 103, 105, 111, 725/114, 115, 118, 149
See application file for complete search history.

(56) References Cited

U.S. PATENT DOCUMENTS

| | | | | |
|---|---|---|---|---|
| 6,031,841 | A | * | 2/2000 | Woundy ............... 370/410 |
| 6,167,457 | A | | 12/2000 | Eidson et al. ............ 709/328 |
| 6,208,975 | B1 | | 3/2001 | Bull et al. ............... 705/14 |
| 6,324,621 | B2 | | 11/2001 | Singh et al. ............ 711/129 |
| 6,330,610 | B1 | | 12/2001 | Docter et al. ............. 709/229 |
| 6,510,162 | B1 | * | 1/2003 | Fijolek et al. ............ 370/432 |
| 6,704,288 | B1 | * | 3/2004 | Dziekan et al. .......... 370/248 |
| 6,785,564 | B1 | * | 8/2004 | Quigley et al. ........... 455/574 |
| 7,107,326 | B1 | * | 9/2006 | Fijolek et al. ............ 709/220 |
| 7,161,945 | B1 | * | 1/2007 | Cummings .............. 370/401 |
| 2001/0033583 | A1 | * | 10/2001 | Rabenko et al. .......... 370/503 |

* cited by examiner

*Primary Examiner*—Hanh Nguyen
(74) *Attorney, Agent, or Firm*—Weaver Austin Villeneuve & Sampson LLP

(57) ABSTRACT

Disclosed are methods and apparatus for selectively filtering data messages that are communicated between a head end complex and its associated cable modems. Filtering includes obtaining a copy of the message and sending the copied message to a memory device. The memory device is accessible, for example, via a user so that the filtered message may be analyzed. In a preferred embodiment, the memory device is a monitoring device in the form of a computer system (e.g., a router). Messages may be filtered to the memory or monitoring device based on any suitable filtering criteria that identifies specific message parameters. In a specific embodiment, filtering may be based on one or more message types. When filtering criteria specifies a particular message type, messages having such a specified type are filtered to the monitoring station. Additionally or alternatively, filtering may be based on one or more values of a particular field of the message. For instance, when filtering criteria is set to a particular field value, messages that contains that particular field value are copied and sent to the monitoring device. Filtering may also or alternatively be based on whether a message is associated with the downstream channel, the upstream channel, or a particular port number.

71 Claims, 13 Drawing Sheets

454

| Type value | Version | Message Name | Message Description |
|---|---|---|---|
| 1 | 1 | SYNC | Timing Synchronization |
| 2 | 1 | UCD | Upstream Channel Descriptor |
| 3 | 1 | MAP | Upstream Bandwidth Allocation |
| 4 | 1 | RNG-REQ | Ranging Request |
| 5 | 1 | RNG-RSP | Ranging Response |
| 6 | 1 | REG-REQ | Registration Request |
| 7 | 1 | REG-RSP | Registration Response |
| 8 | 1 | UCC-REQ | Upstream Channel Change Request |
| 9 | 1 | UCC-RSP | Upstream Channel Change Response |
| 10 | 1 | TRI-TCD | Telephony Channel Descriptor [DOCSIS6] |
| 11 | 1 | TRI-TSI | Termination System Information [DOCSIS6] |
| 12 | 1 | BPKM-REQ | Privacy Key Management Request [DOCSIS8] |
| 13 | 1 | BPKM-RSP | Privacy Key Management Response [DOCSIS8] |
| 14 | 2 | REG-ACK | Registration Acknowledge |
| 15 | 2 | DSA-REQ | Dynamic Service Addition Request |
| 16 | 2 | DSA-RSP | Dynamic Service Addition Response |
| 17 | 2 | DSA-ACK | Dynamic Service Addition Acknowledge |
| 18 | 2 | DSC-REQ | Dynamic Service Change Request |
| 19 | 2 | DSC-RSP | Dynamic Service Change Response |
| 20 | 2 | DSC-ACK | Dynamic Service Change Acknowledge |
| 21 | 2 | DSD-REQ | Dynamic Service Deletion Request |
| 22 | 2 | DSD-RSP | Dynamic Service Deletion Response |
| 23 | 2 | DCC-REQ | Dynamic Channel Change Request |
| 24 | 2 | DCC-RSP | Dynamic Channel Change Response |
| 25 | 2 | DCC-ACK | Dynamic Channel Change Acknowledge |
| 26 | 2 | DCI-REQ | Device Class Identification Request |
| 27 | 2 | DCI-RSP | Device Class Identification Response |
| 28 | 2 | UP-DIS | Upstream Transmitter Disable |
| 29-255 | | | Reserved for future use |

FIG. 4C

APPARATUS AND METHODS FOR SNIFFING DATA IN A CABLE HEAD END

BACKGROUND OF THE INVENTION

The present invention relates to digital computer network technology. More specifically, it relates to methods and apparatus for monitoring data within an access network.

Broadband access technologies such as cable, fiber optic, and wireless have made rapid progress in recent years. Recently there has been a convergence of voice and data networks which is due in part to United States deregulation of the telecommunications industry. In order to stay competitive, companies offering broadband access technologies need to support voice, video, and other high-bandwidth applications over their local access networks. For networks that use a shared access medium to communicate between subscribers and the service provider (e.g., cable networks, wireless networks, etc.), providing reliable high-quality voice/video communication over such networks is not an easy task.

One type of broadband access technology relates to cable modem networks. A cable modem network or "cable plant" employs cable modems, which are an improvement of conventional PC data modems and provide high speed connectivity. Cable modems are therefore instrumental in transforming the cable system into a full service provider of video, voice and data telecommunications services.

A head end complex and cable modem typically communicate. This communication may be one-way or two-way between the cable modem and head end complex. In one way communication, the cable modem merely receives data from the head end complex, but cannot transmit data to the head end complex. For example, the cable modem cannot request particular types of data from the head end complex. In two-way communication, the cable modem can transmit data (e.g., data requests) to the head end complex. Presently, no mechanism is provided for monitoring the data communication between a head end complex and its associated cable modems.

Accordingly, there is a need for mechanisms for monitoring data communicated between the head end complex and the cable modem. Additionally, since different monitoring groups may have different needs, there is a desire for mechanisms for selectively filtering various types of data.

SUMMARY OF THE INVENTION

Accordingly, the present invention provides methods and apparatus for selectively filtering data messages that are communicated between a head end complex and its associated cable modems. Filtering includes obtaining a copy of the message and sending the copied message to a memory device. The memory device is accessible, for example, via a user so that the filtered message may be analyzed. In a preferred embodiment, the memory device is a monitoring device in the form of a computer system (e.g., a router). Messages may be filtered to the memory or monitoring device based on any suitable filtering criteria that identifies specific message parameters. In a specific embodiment, filtering may be based on one or more message types. When filtering criteria specifies a particular message type, messages having such a specified type are filtered to the monitoring station. Additionally or alternatively, filtering may be based on one or more values of a particular field of the message. For instance, when filtering criteria is set to a particular field value, messages that contains that particular field value are copied and sent to the monitoring device. Filtering may also or alternatively be based on whether a message is associated with the downstream channel, the upstream channel, or a particular port number.

In one embodiment, a method for filtering messages communicated between a cable head end and one or more cable modems. Message filtering criteria is selected. A message is received at the cable head end from a cable modem or a message that is to be transmitted to a cable modem. When the received message meets the filtering criteria, the received message is copied and the copied message is sent to a memory device. In a specific embodiment, the memory device forms part of a computer system that is accessible via a computer network (e.g., the Internet). In a specific implementation, when the received message is to be transmitted to a cable modem, the received message is forwarded to the cable modem. When the received message is from a cable modem, the received message is processed at the cable head end.

In specific embodiments, the filtering criteria specifies a message type and the received message meets the filtering criteria when the received message has the specified message type. In one aspect, the message type is a MAP message. In other aspects, the filtering criteria also specifies one or more service identifiers and the filtering criteria is met when the received message is a MAP message that contains any specified service identifier. In other aspects, the filtering criteria further specifies one or more MAC addresses and the filtering criteria is met when the received message is a MAP message that contains any specified MAC address. In a further implementation, the filtering criteria further includes an option to append a time stamp to the copied message. In another embodiment, the filtering criteria further includes an option to strip a MAC Management Header from the copied message.

In a further implementation, the message type is a dynamic service message. In further aspects, the filtering criteria further specifies one or more service identifiers and the filtering criteria is met when the received message is a dynamic service message that contains any specified service identifier. In another implementation, he filtering criteria further specifies a dynamic service message type and the filtering criteria is met when the received message is a dynamic service message that contains the specified dynamic service message type. The dynamic service message type may be a message for adding, a message for deleting, and a message for changing one or more services.

In a further aspect, the filtering criteria specifies one or more access control type parameters and the filtering criteria is met when the received message contains any specified access control type parameter. In another embodiment, the filtering criteria specifies either a downstream or downstream direction and the filtering criteria is met when the received message is associated with the specified direction.

In another aspect, the invention pertains to a computer system operable to filter messages communicated between a cable head end and one or more cable modems. The computer system includes one or more processors and one or more memory. At least one of the processors and memory are adapted to perform one or more of the above described inventive methods. In an alternative embodiment, the invention pertains to a computer program product for filtering messages communicated between a cable head end and one or more cable modems. The has at least one computer readable medium and computer program instructions stored within the at least one computer readable product configured to cause a computer system to form one or more of the above described inventive methods. In a final embodiment, the invention pertains to an apparatus comprising means for performing one or more of the above described inventive methods.

These and other features and advantages of the present invention will be presented in more detail in the following specification of the invention and the accompanying figures which illustrate by way of example the principles of the invention.

BRIEF DESCRIPTION OF THE DRAWINGS

FIG. 4C shows a table listing currently available message types for MAC Management Messages.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
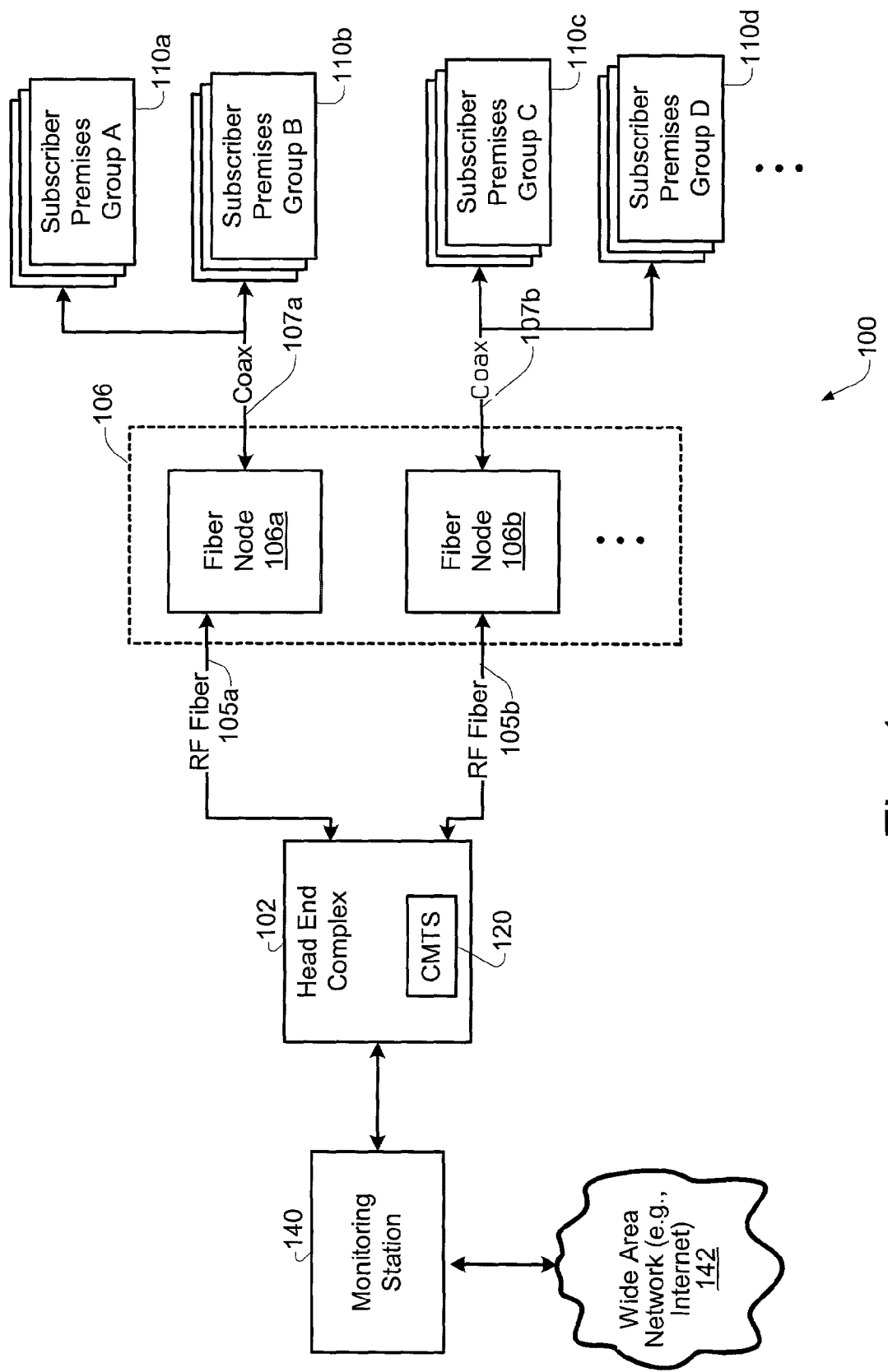
FIG. 1 shows a specific embodiment of a cable network which may be used with the techniques of the present invention.

FIG. 1 shows a block diagram of a two-way hybrid fiber-coaxial (HFC) cable network 100 in accordance with one embodiment of the present invention. Of course, the present invention may also be implemented on a one-way cable network. As shown in FIG. 1, the cable network 100 includes a Head End complex 102 typically configured to service about 40,000 homes. The Head End complex 102 may include a plurality of components and/or systems (not shown) such as, for example, a Head End, a super Head End, a hub, a primary hub, a second hub, etc. Additionally, as shown in FIG. 1, the Head End complex 102 typically includes a Cable Modem Termination System (CMTS). Primary functions of the CMTS include (1) receiving data inputs from external sources 100 and converting the data for transmission over the cable plant; (2) providing appropriate Media Access Control (MAC) level packet headers for data received by the cable system, and (3) modulating and demodulating the data to and from the cable network. Typically, the Head End complex 102 is configured to provide a communication interface between nodes (e.g. cable modems) in the cable network and external networks such as, for example, the Internet 142. The cable modems typically reside at the subscriber premises 110A-D.

The Head End Complex 102 is typically connected to one or more fiber nodes 106 in the cable network. Each fiber node is, in turn, configured to service one or more subscriber groups 110. Each subscriber group typically comprises about 500 to 2000 households. A primary function of the fiber nodes 106 is to provide an optical-electronic signal interface between the Head End Complex 102 and the plurality of cable modems residing at the plurality of subscriber groups 110.

In order for data to be able to be transmitted effectively over a computer network such as HFC or other broadband computer networks, a common standard for data transmission is typically adopted by network providers. A commonly used and well known standard for transmission of data or other information over HFC networks is the Data Over Cable System Interface Specification (DOCSIS). The DOCSIS standard has been publicly presented by Cable Television Laboratories, Inc. (Louisville, Colo.), in a document entitled, DOCSIS 1.1 RF Interface Specification (document control number SP-RFIv1.1-I06-001215, Dec. 15, 2000). This document is incorporated herein by reference for all purposes.

Communication between the Head End Complex 102 and fiber node 106a is typically implemented using modulated optical signals which travel over fiber optic cables. More specifically, during the transmission of modulated optical signals, multiple optical frequencies are modulated with data and transmitted over optical fibers such as, for example, optical fiber links 105a and 105b of FIG. 1, which are typically referred to as "RF fibers". As shown in FIG. 1, the modulated optical signals transmitted from the Head End Complex 102 eventually terminate at the fiber node 106a. The fiber nodes maintain the signal modulation while converting from the fiber media to the coax media and back.

Each of the fiber nodes 106 is connected by a coaxial cable 107 to a respective group of cable modems residing at subscriber premises 110A-D. According to the DOCSIS standard, specific frequency ranges are used for transmitting downstream information from the CMTS to the cable modems, and other specific frequency ranges are used for transmitting upstream information from the cable modems to the CMTS.

In order to allow the cable modems to transmit data to the CMTS, the cable modems share one or more upstream channels within that domain. Access to the upstream channel is controlled using a time division multiplexing (TDM) approach. Such an implementation requires that the CMTS and all cable modems sharing an upstream channel within a particular domain have a common concept of time so that when the CMTS tells a particular cable modem to transmit data at time T, the cable modem understands what to do. "Time" in this context may be tracked using a counter, commonly referred to as a timer counter, which, according to conventional implementations is a 32-bit counter that increments by one every clock pulse.

Typically, digital data on upstream and downstream channels of the cable network is carried over radio frequency ("RF") carrier signals. Cable modems convert digital data to a modulated RF signal for upstream transmission and convert downstream RF signal to digital form. The conversion is done at a subscriber's facility. At a Cable Modem Termination System ("CMTS"), located at a Head End Complex of the cable network, the conversions are reversed. The CMTS converts downstream digital data to a modulated RF signal, which is carried over the fiber and coaxial lines to the subscriber premises. The cable modem then demodulates the RF signal and feeds the digital data to a computer. On the return path, the digital data is fed to the cable modem (from an associated PC for example), which converts it to a modulated RF signal. Once the CMTS receives the upstream RF signal, it demodulates it and transmits the digital data to an external source.

Over time different types of messages are communicated between the head end 102 and one or more cable modem(s). In one embodiment, these messages may include MAP messages, dynamic service messages, and other types of data messages. The head end 102 periodically sends a MAP message that specifies one or more times slots for identified cable modems to the cable modems 110 associated with such head end 102. A cable modem 110 or CMTS may send a dynamic service message for adding, deleting, or changing a particular service type or a parameter of an existing service. A data messages is generally defined as any type of message that is communicated between the head end 102 and one or more cable modems.

The present invention provides mechanisms for filtering one or more types of messages. Additionally, mechanisms are provided for filtering messages based on any suitable message parameter. For example, a particular message type may be filtered based on an identifier of a particular modem (e.g., SID). A single filtering parameter may be applied to one or more particular types of message or all message types. Several examples of message types and message parameters that may be selected as filtering criteria are described further below with reference to FIGS. 2 through 5. In one embodiment, filtering for a particular type of message and for particular filtering parameters for such message type may be selected by inputting one or more command(s) into the head end. For example, each command may specify the type of command (e.g., filtering command), one or more types of messages to be filtered, and one or more filtering parameters associated with each message type. Once filtering options are selected, filtering of messages is based on such selected options. The filtered messages are forwarded to a monitoring station 140. The filtered messages may then be accessed and analyzed via any suitable network, such as wide area network 142 (e.g., Internet).

Figure 2:
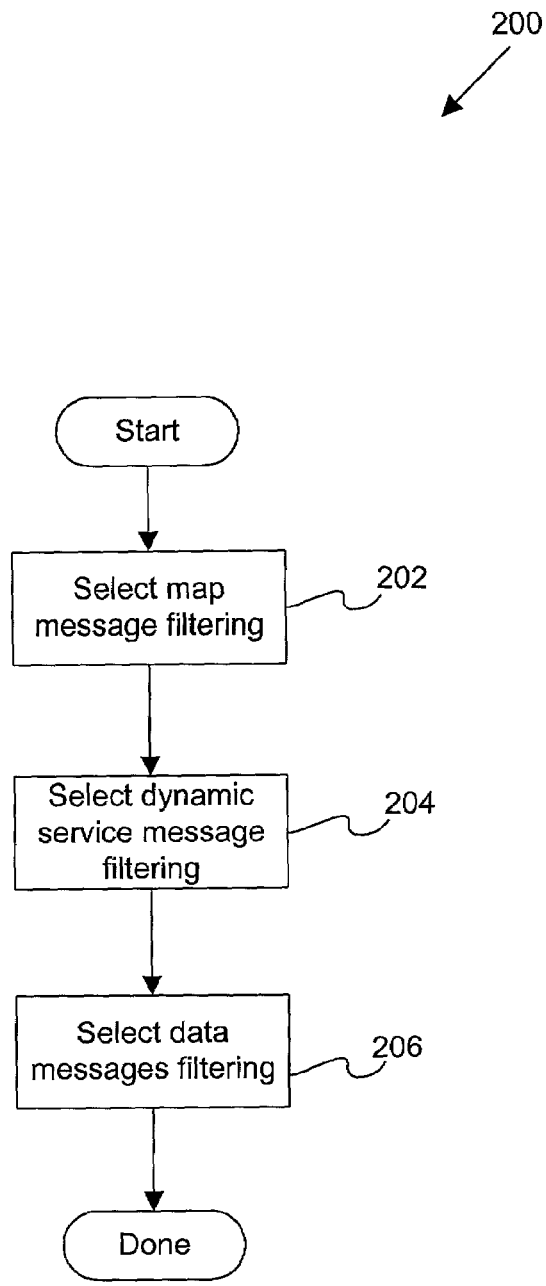
FIG. 2 is a flow chart illustrating a procedure for filtering one or more types of selected communication messages in accordance with one embodiment of the present invention.

FIG. 2 is a flow chart illustrating a procedure 200 for filtering one or more types of selected communication messages in accordance with one embodiment of the present invention. Any suitable type of messages may be selected for filtering. That is, the message types shown in the FIG. 2 are merely illustrative and are not meant to limit the scope of the invention. Additionally, different types of message types may be selected for filtering in any suitable order. In sum, FIG. 2 represents one possible filtering selection flow. That is, the operations of FIG. 2 may be performed in any suitable order. As shown, MAP messages may be selected for filtering in operation 202. Dynamic service messages may also be selected for filtering in operation 204. Additionally, data messages may be selected for filtering in operation 206. Each type of filtering selection is optional. That is, any operation of FIG. 2 may be skipped. For example, a user may select one or more types of messages for filtering. Note that the term "data message" includes all types of messages.

Figure 3A:
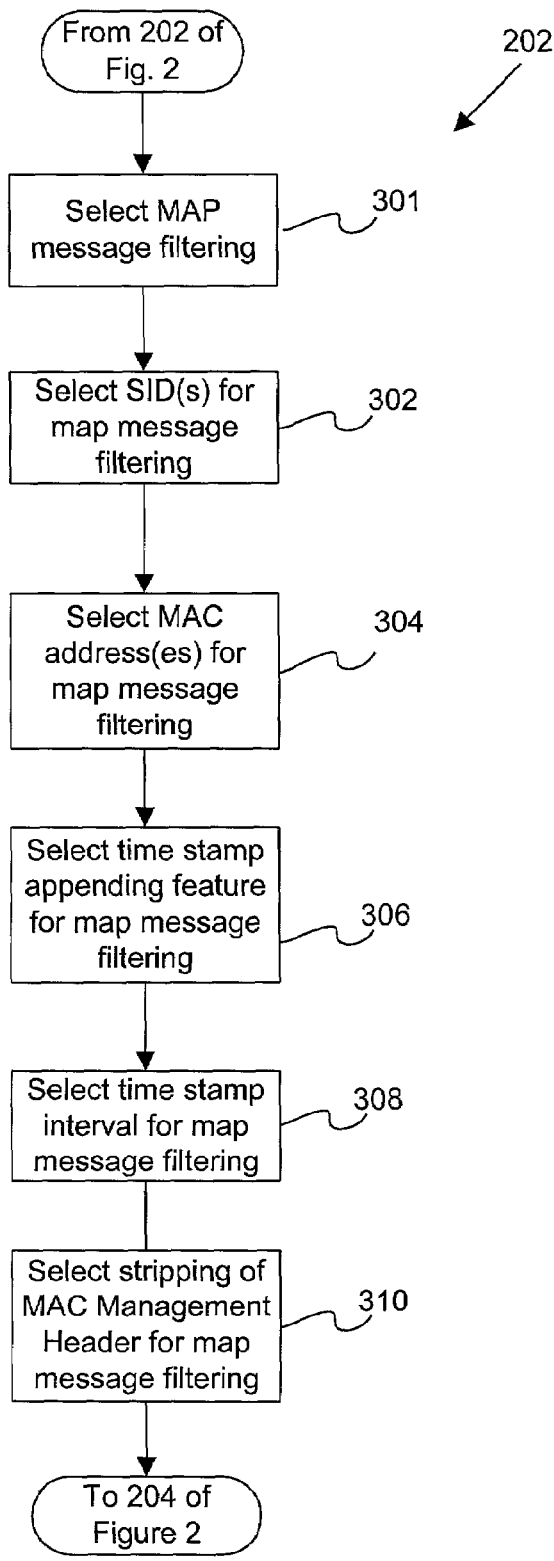
FIG. 3A is a flowchart illustrating the operation of FIG. 2 for selecting MAP message filtering in accordance with one embodiment of the present invention.
Figure 3B:
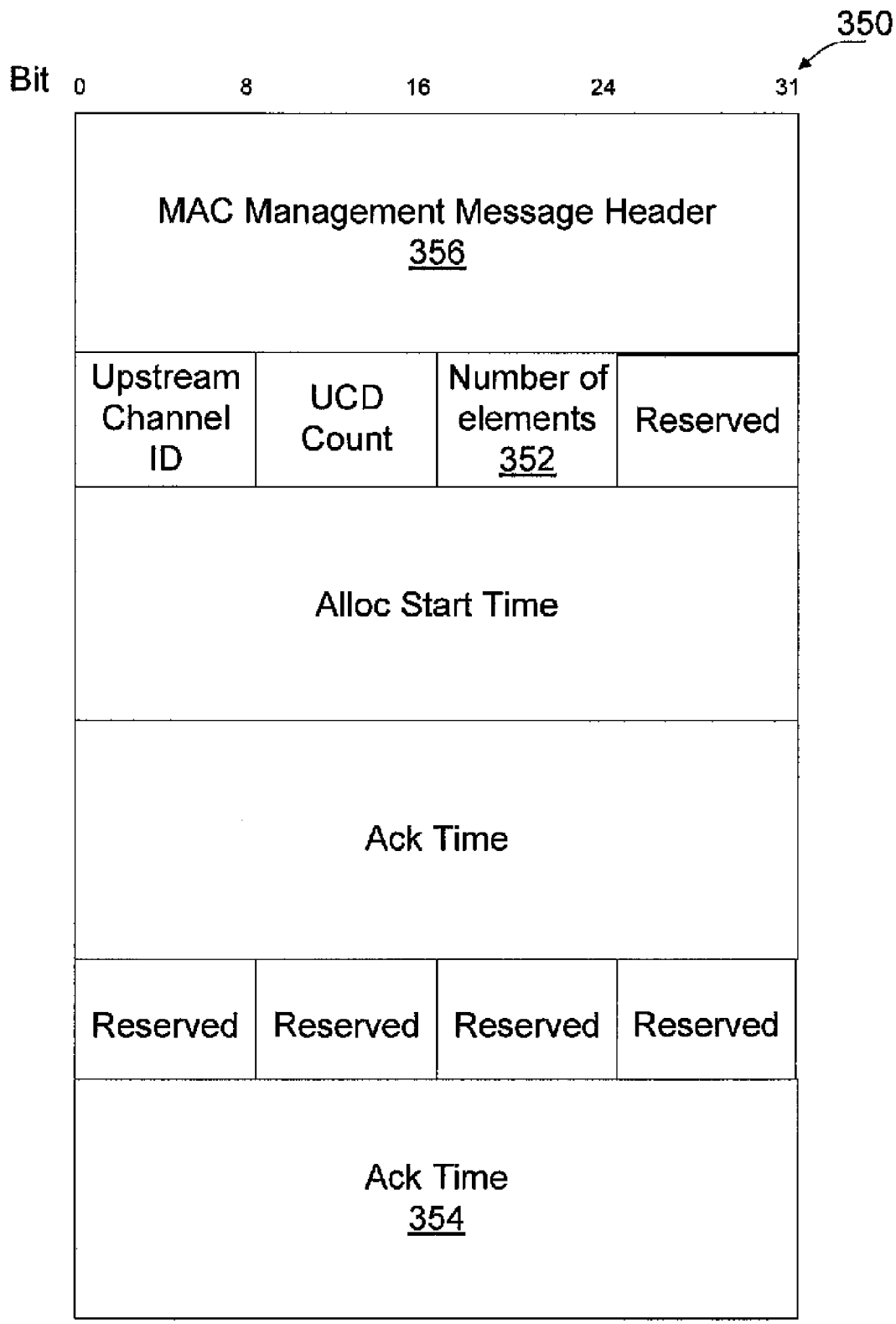
FIG. 3B illustrates a DOCSIS 1.1 standard MAP message.
Figure 3C:
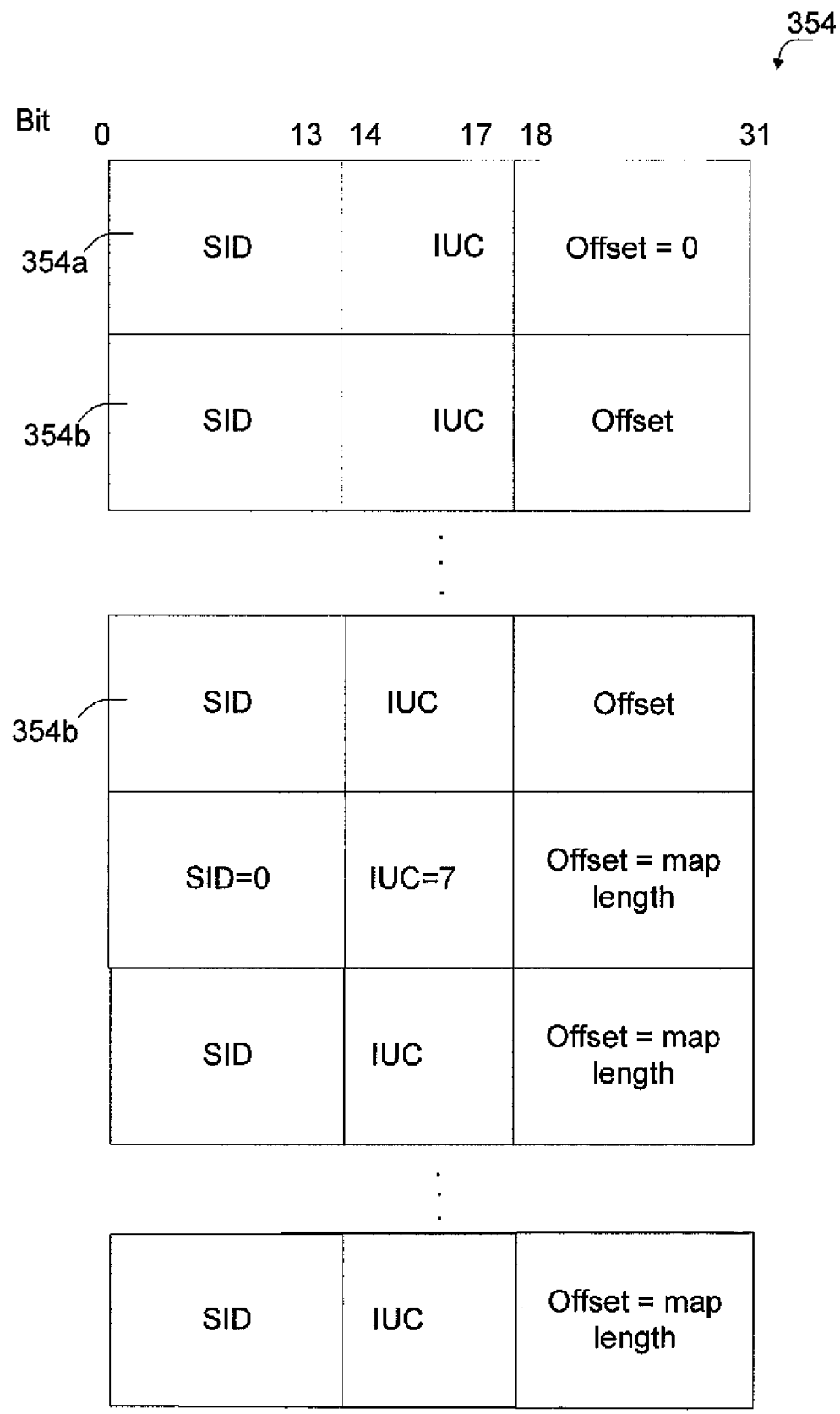
FIG. 3C is a diagrammatic representation of the MAP information elements of FIG. 3B.

FIG. 3A is a flowchart illustrating the operation 202 of FIG. 2 for selecting MAP message filtering in accordance with one embodiment of the present invention. Any suitable MAP message parameter may be selected as a filtering option. For example, any data field within a typical MAP message may be selected for MAP message filtering. When a particular field value of a MAP message is selected, MAP messages that contain the selected field value are filtered to the monitoring station. A DOCSIS 1.1 standard MAP message 350 is illustrated in FIG. 3B. As shown, the MAP message 350 includes a number of information elements field 352 that indicates how many MAP information elements 354 are contained in the MAP message 350. FIG. 3C is a diagrammatic representation of the MAP information elements 354 of FIG. 3B. As shown, each MAP information element 354 includes a SID (service identifier) field that identifies a particular cable modem. Each MAP information element 354 also includes timing information (i.e., time slot offsets) for each identified cable modem for transmitting data upstream to the head end as described above.

Referring back to FIG. 3B, the MAP message 350 also includes a standard MAC Management Message Header 356. This Header 356 includes a MAC address that corresponds to a specific cable modem unicast address or to the DOCSIS management multicast address. The multicast address corresponds to all of the cable modems associated with the particular head end. Thus, one may filter all MAP messages associated with a particular head end by selecting the multicast address for such head end.

Accordingly, one or more data fields within the MAP message may be selected as a filtering option. In the illustrated embodiment of FIG. 3A, map messages are selected for filtering in operation 391. One of more SID(s) may be selected for the selected MAP message filtering an operation 302. One or more MAC addresses may also be selected for MAP message filtering an operation 304. Next one may select a time stamp to be appended to the filtered MAP messages in operation 306. Additionally, a time stamp interval may be also selected in operation 308. Additionally, an option may be selected for stripping the MAC Management Message Header (e.g., 356) from the MAP message before it is forwarded to the monitoring station (e.g., 140). The procedure then returns to operation 204 of FIG. 2. Once one or more MAP message filtering options are selected, filtering of MAP messages may be based on such selected filtering options as described further below with reference to FIG. 6.

A time stamp is advantageously added to the filtered MAP message (or other types of messages) so that the timing of the filtered messages may be analyzed for various purposes. For example, the timing of the messages may be analyzed to determine whether particular messages are being delayed more than others. The overall efficiency of communication between the head end and cable modems may be maximized by focussing design efforts on increasing the throughput of such bottle neck messages. The timestamp may be associated with a filtered MAP message (other message type) using any suitable technique. In the illustrated embodiment, a timestamp with a granularity equal to the selected time interval is appended to each filtered MAP message. Alternatively, a constant may be used as the timestamp interval, and the interval is not selectable. Stripping the MAP Management Information Header from the filtered MAP message (or other types of messages) converts the filtered message to a format that is more easily analyzed by commercially available analysis tools are not configured to process this type of header. In alternative embodiments, the timestamp option and/or header stripping option may be selected once and applied to all types of data messages, rather than selected for each message type.

Figure 4A:
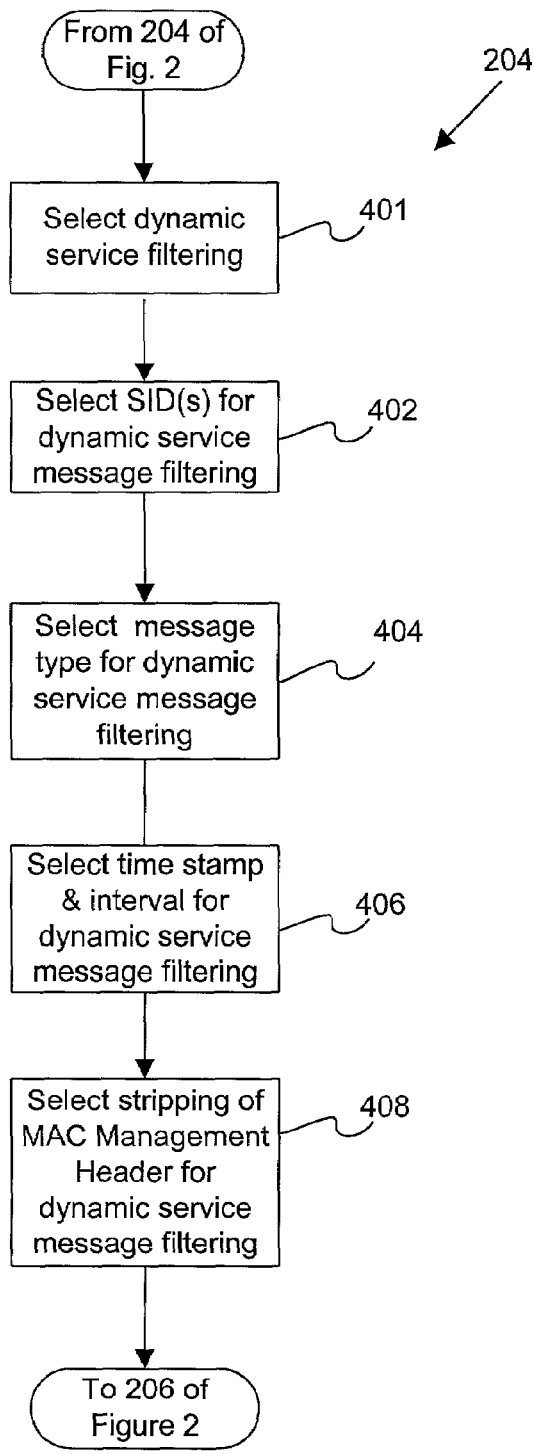
FIG. 4A is a flow chart illustrating the operation of FIG. 2 for selecting dynamic service message filtering in accordance with one embodiment of the present invention.
Figure 4B:
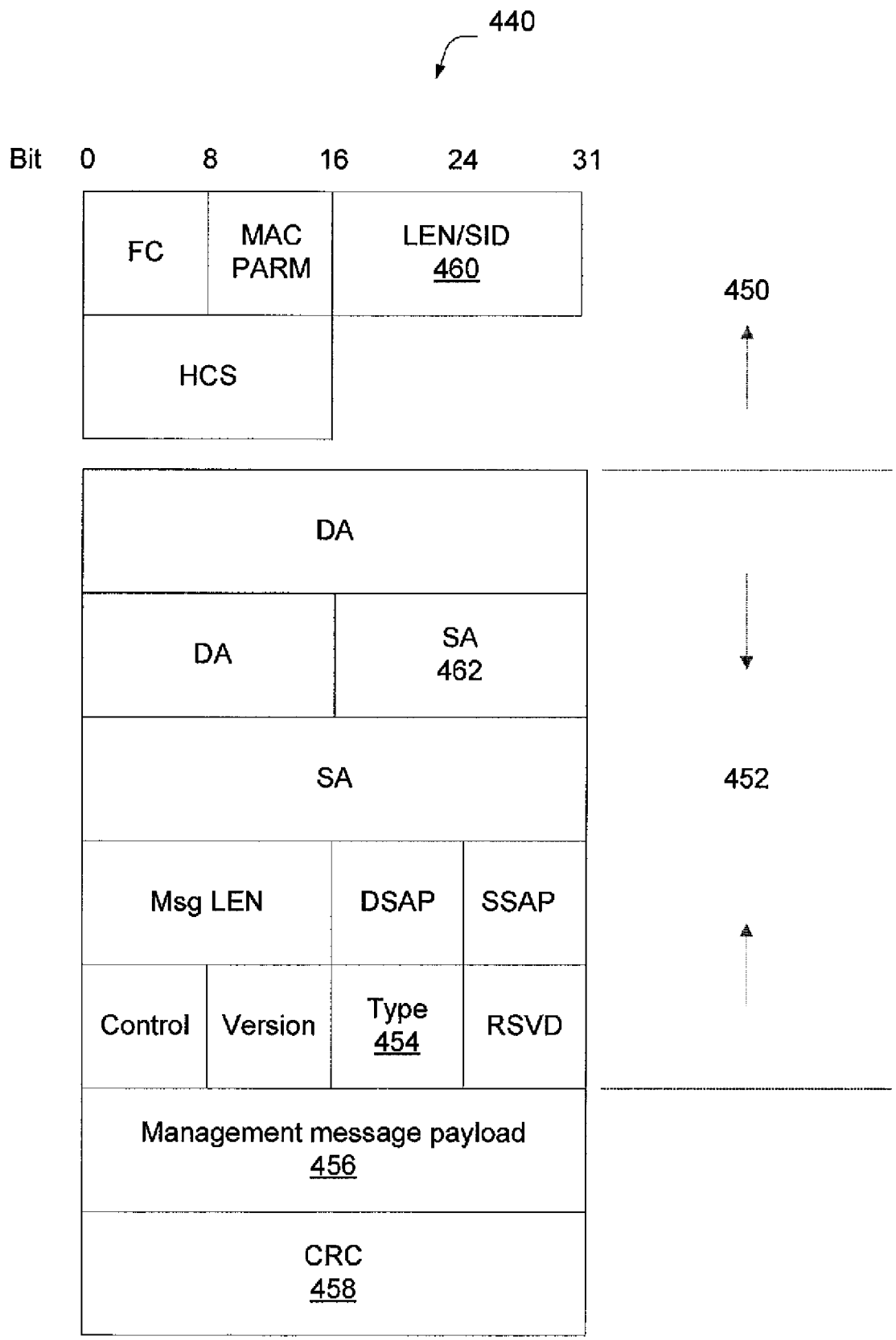
FIG. 4B is a diagrammatic representation of a MAC Management Message.

FIG. 4 is a flow chart illustrating the operation 204 of FIG. 2 for selecting dynamic service message filtering in accordance with one embodiment of the present invention. Initially, one or more SID(s) are selected for dynamic service message filtering in operation 402. One or more message types may then be selected for dynamic service message filtering in operation 404. For example, message types may include any of the available MAC Management Message Types specified by the DOCSIS specification. FIG. 4B is a diagrammatic representation of a MAC Management Message 440 (which includes dynamic service messages, as well as MAP and other types of data messages). As shown, the MAC Management Message includes a MAC header 450, Management Message Payload 456, and CRC value 458. The MAC Management Message Header 452 includes a message type field 454 that specifies the message type.

FIG. 4C is a table listing available message types. In one embodiment, message types that are selectable for filtering include messages from a cable modem or CMTS for adding, changing, or deleting one or more services and requests by a cable modem for a MAP from the head end. For example, if messages for adding a service is selected for filtering, messages that have a type field equal to 15, 16, or 17 (as indicated in FIG. 4C) are filtered to the monitoring station 140. Note that the cable modem's service ID (SID) is specified in field 460 for service requests by a cable modem. Otherwise, this field 460 specifies the message length. Similarly, the MAC address is specified in field 462.

Referring back to FIG. 4A, a timestamp having a selected time interval may also be selected for appending to each filtered dynamic service message in operation 406. The MAC Management Information Header may be selected for stripping from the filtered dynamic service messages in operation 408. The filter selection procedure then returns to operation 206 of FIG. 2.

Figure 5:
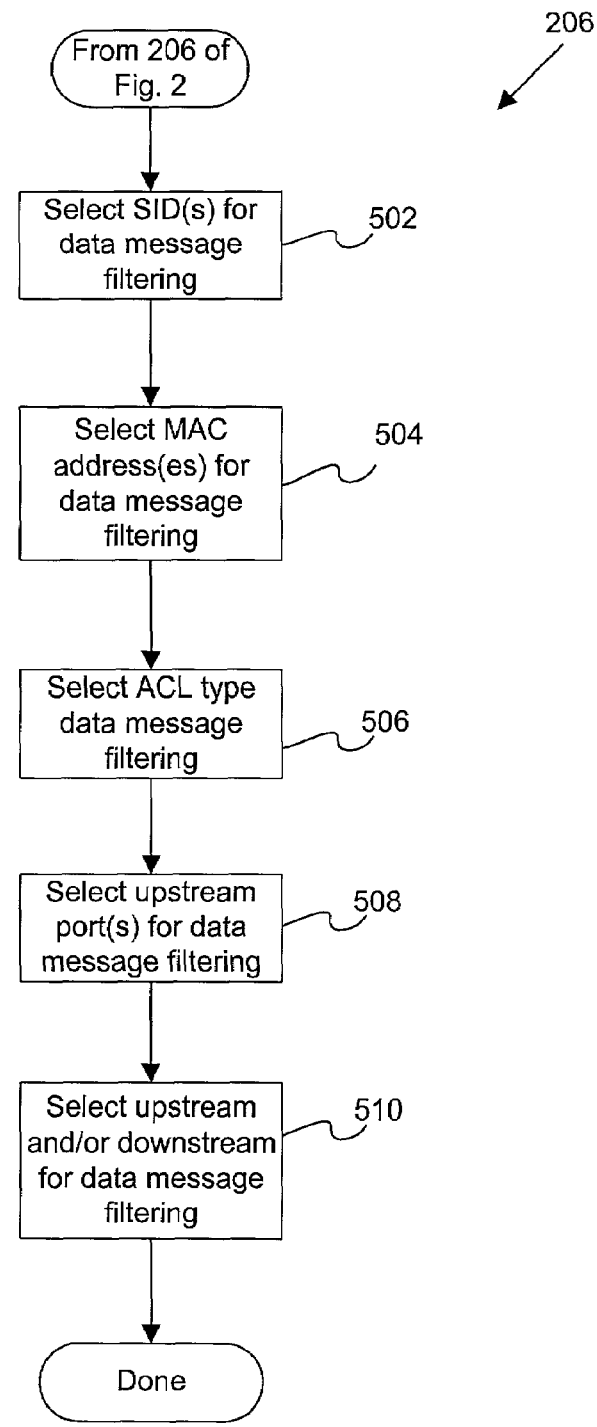
FIG. 5 is a flow chart illustrating the operation of FIG. 2 for selecting data message filtering in accordance with one embodiment of the present invention.

Any type of data messages may be selected, regardless of message type (e.g., MAP or dynamic service messages). FIG. 5 is a flow chart illustrating the operation 206 of FIG. 2 for selecting data message filtering in accordance with one embodiment of the present invention. As shown, one or more SID(s) may be selected for data message filtering in operation 502. One or more MAC addresses may alternatively be selected for data message filtering in operation 504.

An access control list (ACL) type data filtering option may also be selected in operation 506. An ACL generally includes a selected list of layer 3 or layer 4 parameters upon which data filtering is based. That is, an ACL is typically used to allow only data meeting the selected parameters to be forwarded to its particular destination. The operating system of the CMTS typically provides mechanisms for a user to set up a particular ACL that is then used to filter data. The ACL may include one or more destination addresses, source addresses, destination port numbers, source port numbers, routing protocols, such as Internet Gateway Routing Protocol (IGRP), Open Shortest Path First (OSPF), Protocol-Independent Multicast (PIM), Authentication Header Protocol (AHP), etc. In other words, an existing ACL used by the operating system (e.g., of the CMTS or line card) may also be utilized in the present invention for filtering a copy of data to the monitoring station. Alternatively, the present invention may include mechanisms (e.g., independent of the operating system mechanisms) for creating a list of selected layer 3 or layer 4 filtering parameters based on user selections.

One or more upstream ports may also or alternatively be selected for data message filtering in operation 508. The upstream and/or downstream may also or alternatively be selected for data message filtering in operation 510. For example, all upstream data may be selected for filtering to the monitoring station. A timestamp option and/or header stripping option may also be selected in operations 512 and 514, respectively.

Figure 6:
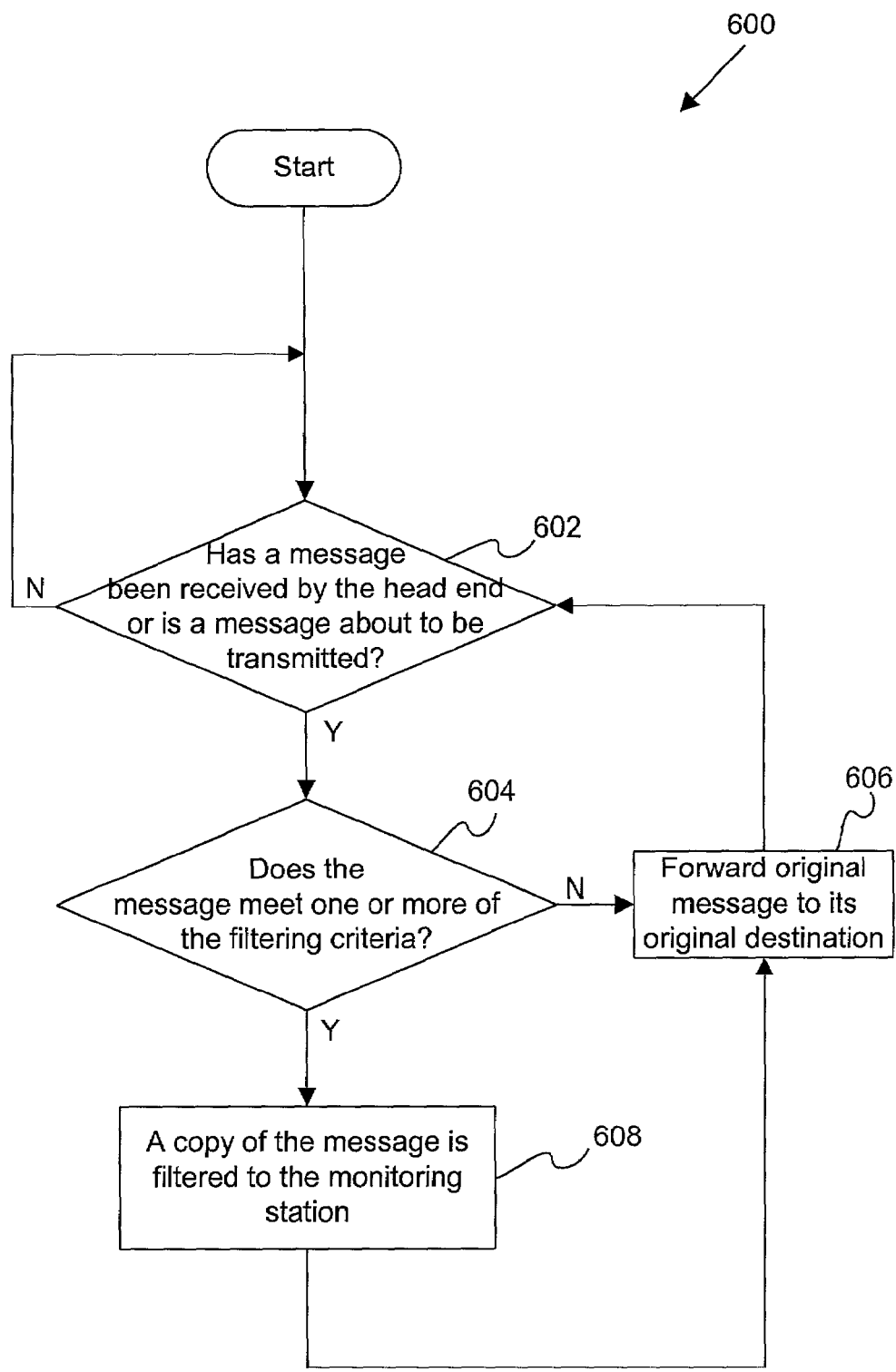
FIG. 6 is a flowchart illustrating a filtering procedure in accordance with one embodiment of the present invention.

After one or more filtering options are selected, filtering may commence. FIG. 6 is a flowchart illustrating a filtering procedure 600 in accordance with one embodiment of the present invention. Initially, it is determined whether a message has been received by the head end or is about to be transmitted in operation 602. If a message is about to be transmitted or has been received, the message is analyzed to determine if it meets one or more of the selected filtering criteria in operation 604. The filtering criteria may be selected in any suitable manner (e.g., as described above with reference to FIGS. 2 through 5). Alternatively, it may be determined whether the message meets all of the selected parameters.

Determining whether a message meets one or more of the filtering criteria may be performed in any suitable manner. In general terms, when the filtering criteria is based on message type (e.g., service addition messages, etc.) particular fields of the message that indicate message type are analyzed. For MAC Management formatted messages, it is determined whether the MAC Management Message Type field is set to a value that corresponds to a message type of the filtering criteria. Additionally, it may be determined whether the SID field of the service request message or MAP message (shown as field 460 in FIG. 4B or field 360 in FIG. 3C, respectively) matches the filtering criteria. Likewise, when a particular MAC address is selected as a filtering option, it may determined whether the MAC field (shown as field 462 in FIG. 4B) matches the selected MAC address value.

Additionally, it may be determined whether the message is arriving on the upstream channel or being transmitted on a downstream channel when the filtering criteria is based on upstream or downstream messages, respectively. Likewise, if a particular port is selected as a filtering criteria, messages arriving or being transmitted on that particular port are determined to meet the filtering criteria. When ACL type filter criteria are selected, it may be determined whether the message includes the selected source IP address, destination IP address, source port, and/or destination port value(s).

In the illustrated embodiment, if the message does not meet any of the filtering criteria, the message is simply forwarded to its intended destination in operation 606. If the message meets one or more of the selected filtering options criteria, a copy of the message is filtered to the monitoring station 140 in operation 608. The original message may then be forwarded to its original destination in operation 606. The filtering process repeats in operation 602, where it is determined again whether a message has been received or is about to be transmitted. The filtered messages may be analyzed by accessing the monitoring station 140, for example, via the Internet at any suitable time (e.g., after a number of messages have been copied to the monitoring station via the filtering procedure 600).

Generally, the filtering techniques of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention may be implemented in software such as an operating system or in an application running on an operating system.

A software or software/hardware hybrid system of this invention is preferably implemented on a general-purpose programmable machine selectively activated or reconfigured by a computer program stored in memory. Such a programmable machine may be a network device designed to handle network traffic. Such network devices typically have multiple network interfaces. One important class of device that may be used to implement the present invention is the Cable Modem Termination System. Preferably, the CMTS is a "routing" CMTS, which handles at least some routing functions.

Figure 7:
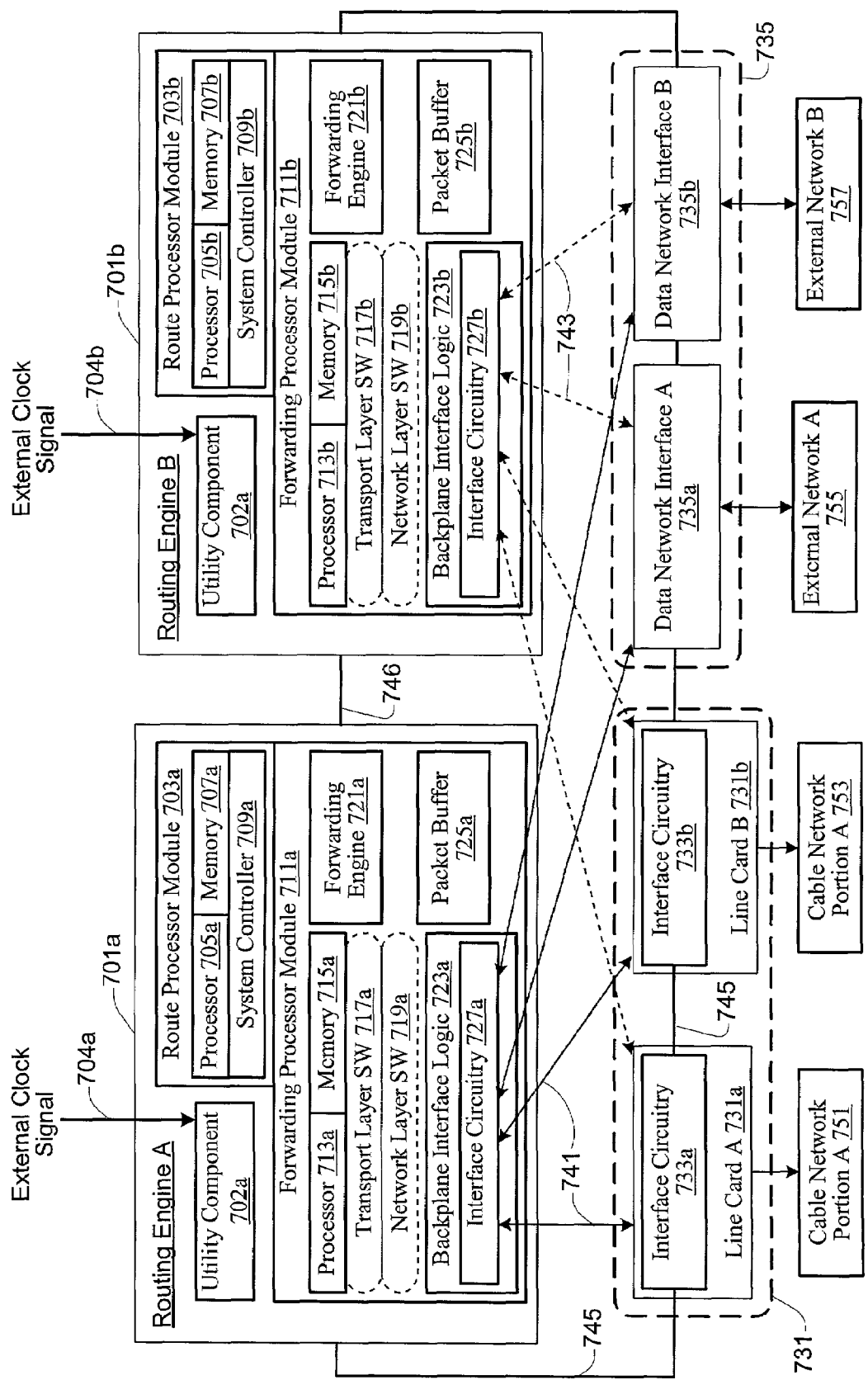
FIG. 7 shows a block diagram of a Cable Modem Termination System (CMTS) which may be used for implementing one or more techniques of the present invention.

FIG. 7 shows a block diagram of a specific embodiment of a Cable Modem Termination System (CMTS) 700 which may be used to implement certain aspects of the present invention. As shown in FIG. 7, the CMTS 700 may comprise a plurality of routing engines (e.g. 701a, 701b). In a specific implementation, Routing Engine A 701a may be configured as a primary or working routing engine, while Routing Engine B 701b may be configured as a backup or standby routing engine which provides redundancy functionality.

As shown in the embodiment of FIG. 7, each of the routing engines may include a variety of similar modules and/or components. In order to avoid confusion, the various components and/or modules relating to Routing Engine A 701a will now be described in greater detail with the understanding that such descriptions may also be applied to the corresponding components and modules of Routing Engine B 701b.

According to a specific embodiment, Routing Engine A may be configured or designed to include a plurality of functionally different modules or components, including, for example, a Forwarding Processor (FP) Module 711a adapted to provide packet forwarding functionality; a Route Processor (RP) Module 703a adapted to implement routing or forwarding operations; a utility component 702a adapted to provide system clock and timestamp functionality; etc. The routing engine components may be configured to provide layer one, layer two, layer three and layer four functionality as well as quality of service (QoS) functionality.

According to a specific implementation, the RP Module 703a may be configured as a processor-based routing system comprising functionality incorporated within a typical router, such as, for example, specially configured router models 1600, 2500, 2600, 3600, 4500, 4700, 7200, 7500, 10012, and 12000 available from Cisco Systems, Inc. of San Jose, Calif. For example, as shown in the embodiment of FIG. 7, the RP Module 703a comprises a general-purpose processor 705a (e.g., a MIPS route processor) coupled to a system controller 709a and memory 707a. It should be noted that components have been described in singular form for clarity. One skilled in the art would appreciate that multiple processors, a variety of memory formats, or multiple system controllers, for example, can be used in this context as well as in other contexts while falling within the scope of the present invention. The memory 707a may comprise synchronous dynamic random access memory (SDRAM) storage locations addressable by the processor 705a for storing software programs and data structures accessed by the components. A network routing operating system, portions of which may reside in memory and executed by the route processor, functionally organizes the router by invoking network operations in support of software processes executing on the router.

The RP processor 705a may be configured to construct and load routing tables used by the FP Module 711a. The processor 705a may also be configured or designed to perform configuration management functions of the routing engine 701a, and to communicate with neighboring peer, standby, and/or backup routers to exchange protocol data units used to construct the routing tables in accordance with conventional routing algorithms. It will be apparent to those skilled in the art that other memory types, including various computer readable media, may be used for storing and executing program instructions pertaining to the operation of the routing engine.

Interface circuitry 727a may be coupled to the respective interface circuitry 733a, 733b of line cards 731a, 731b. According to a specific implementation, interface circuitry 727a may be configured to reside on a backplane logic circuit 723a of the routing engine. In one example, the backplane logic circuit 723a is embodied as a high performance, application specific integrated circuit (ASIC). An example of a backplane logic circuit that may be advantageously used with the present invention is disclosed in co-pending and commonly owned U.S. patent application Ser. No. 09/791,063, filed on Feb. 22, 2001, the entirety of which is hereby incorporated by reference for all purposes.

According to a specific embodiment, the backplane logic circuit (which, according to a specific implementation, may be configured as an ASIC), may be configured to further interface the line cards to a packet buffer 725a and a forwarding engine 721a of the FP Module 711a. The packet buffer 725a may include memory which is configured to store packets as the forwarding engine 721a performs its packet forwarding functions. For example, the packet buffer may be used to store low priority data packets while high priority, low latency voice packets are forwarded by the forwarding engine to a data network interface 735a. According to various embodiments, the FP Module 711 may comprise a processor 713a and memory 715a for handling transport layer 717 and network layer 719 functionality. In one implementation, the processor 713a may be configured to track accounting, port, and billing information for various users on a cable modem network 751. The processor 713a may also be configured to maintain desired service flow or session state information in memory 715a such as, for example, for voice calls initiated over the cable modem network. The FP Module 711a may also be configured to provide transaction compacting functionality, data parcel tunneling functionality, switching functionality, filtering option selection and filtering functionality, etc.

According to a specific implementation, Routing Engine A 701a may be connected to Routing Engine B 701b via at least one link 746, such as, for example, a backplane line or system bus. Routing engine redundancy may be provided by designating one of the routing engines as the working or primary routing engine and designating the other routing engine(s) as the redundant or standby routing engine(s). When configured as a working routing engine, the Routing Engine A may perform all appropriate forwarding and routing functions. When a failure occurs at the working routing engine, the redundant routing engine (e.g. Routing Engine B) may then take over the operations of the working routing engine. Thereafter, when Routing Engine A recovers, it may assume the functions of the redundant routing engine, or it may take over the functions of the working routing engine.

According to different embodiments of the present invention, one or more of the routing engines may be configured to communicate with a plurality of line cards (e.g. 731, 735) via point-to-point links. For example, as shown in FIG. 7, each of the plurality of line cards 731 and 735 are connected to each of the routing engines 701a, 701b via point-to-point links 741 and 743. One advantage of the point-to-point link configuration is that it provides additional reliability in that the failure of one or more line cards will not interfere with communications between other line cards and the routing engine(s). For example, if Line Card A 731a suddenly failed, each of the routing engines would still be able to communicate with the other line cards.

According to a specific embodiment, the plurality of line cards may include different types of line cards which have been specifically configured to perform specific functions. For example, line cards 731 may correspond to radio-frequency (RF) line cards which have been configured or designed for use in a cable network. Additionally, line cards 735 may correspond to network interface cards which have been configured or designed to interface with different types of external networks (e.g. WANs, LANs,) utilizing different types of communication protocols (e.g. Ethernet, Frame Relay, ATM, TCP/IP, etc). For example, the data network interface 735a functions as an interface component between external data sources and the cable system. The external data sources transmit data to the data network interface 735a via, for example, optical fiber, microwave link, satellite link, or through various media. A data network interface may include hardware and software for interfacing to various networks. According to various embodiments, a data network interface may be implemented on a line card as part of a conventional router for a packet-switched network. Using this type of configuration, the CMTS is able to send and/or receive IP packets to and from the data network interface using, for example, network layer software 719a.

According to a specific implementation, the operations associated with obtaining an IP address for cable modems may be implemented by the network layer software. This may involve the CMTS communicating with a DHCP server (not shown) via a data network interface, for example.

As shown in FIG. 7, at least a portion of the line cards includes interface circuitry for providing an appropriate interface between the host line card, other line cards, and/or the routing engine(s). For example, interface circuitry 733a may include interconnect ports coupled to one or more of the point-to-point links 741, 743. According to a specific implementation, the interface circuitry functions as a translator that converts conventional formats of data received at the line cards to a suitable protocol format for transmission from the line card to the appropriate routing engine. In one implementation, the interface circuitry 733a may also include circuitry to perform cyclic redundancy code (CRC) generation and checking on packets, along with interconnect format checking.

According to a specific embodiment, the point-to-point links 741, 743 may be configured as clock forwarded links such that each point-to-point link comprises a at least one data wire for transporting data signals and at least one clock wire for carrying clock signals. However, it will be understood to those skilled in the art that the clock forwarding technique may be scaled to accommodate other clock forwarding arrangements such as, for example, connections comprising a plurality or data signals and/or clock signals. Additionally, according to a specific embodiment, each line card may be configured to provide at least one communication interface between the routing engines (701a, 701b) and a portion of the cable network. The data network interface 735a may couple the routing engine 701a to an external data network 755 such as, for example, the Internet.

According to one embodiment, all or selected lines cards, routing engines and/or data network interfaces may be configured to use at least one common dedicated line or backplane (e.g. 745). According to other embodiments, the routing engines 701a, 701b may have an additional dedicated connection(s) for supporting redundancy. In a specific implementation, the backplane may be configured as an Ethernet medium that is shared by the CMTS. When the line cards are inserted into the backplane, they communicate with the routing engines over the lines 745 in accordance with a "capabilities" exchange that identifies the types of line cards and their various characteristics/parameters.

According to a specific implementation, during initialization of the CMTS, the routing engines 701a and 701b negotiate for working routing engine status over the backplane. Assertion of working status causes the line cards 731 to configure their respective interface circuitry to communicate with the designated working routing engine (e.g. Routing Engine A 701a). The Routing Engine A 701a then configures the CMTS and line cards, establishes routing relationships, and initiates traffic forwarding operations. The redundant routing engine 701b may complete a self-test and perform initialization of its various functions. The two routing engine assemblies may then exchange conventional negotiation messages (which may include, for example, health and status messages) via the backplane lines 745. According to a specific implementation, the exchanged messages are defined by an Enhanced High System Availability (EHSA) negotiation algorithm available from Cisco Systems, Inc. of San Jose, Calif. The redundant routing engine may also request transaction information from the working routing engine.

When the redundant routing engine 701b detects that the primary routing engine has failed, the redundant routing engine may take over as the new working routing engine, and initiate a "cutover" operation to thereby cause the line card interface circuitry (e.g. 733a, 733b) to identify and communicate with the new working routing engine 701b. The new working routing engine 701b may then access and retrieve state information (such as, for example, telephone call state information, service flow state information, etc.) stored on selected line cards in order to maintain existing service flows.

Prior to a failure situation, the redundant routing engine 701b may be configured to monitor the status of the working routing engine 701a, and may further be configured or designed to receive updated configuration, transaction and/or state information, which may then be stored in an appropriate location in the redundant routing engine 701b.

The line cards may further comprise circuitry for "looping" packets back onto the redundant routing engine 701b over the point-to-point links. This allows the redundant routing engine 701b to send and receive test packets to evaluate its own operation in addition to the operation of the dedicated lines prior to the occurrence of a system failure.

The filtering techniques of the present invention may be implemented on various general purpose Cable Modem Termination Systems. In a specific embodiment, the systems of this invention may be specially configured CMTSs such as, for example, specially configured models in the uBR-7200 and uBR-10012 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Although the system shown in FIG. 7 represents one specific CMTS architecture of the present invention, it is by no means the only CMTS architecture on which the present invention can be implemented. For example, other types of interfaces and media could also be used with the CMTS.

Regardless of network device's configuration (for cable plants or otherwise), it may employ one or more memories or memory modules (e.g., memory 707a, 715a, etc.) configured to store program instructions for the network operations and other functions of the present invention described herein. The program instructions may specify an operating system and one or more applications, for example. Such memory or memories may also be configured to store data structures, selected filtering criteria, or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM Examples of program instructions include both machine code, such as produced by a compiler, and files containing higher level code that may be executed by the computer using an interpreter.

Figure 8:
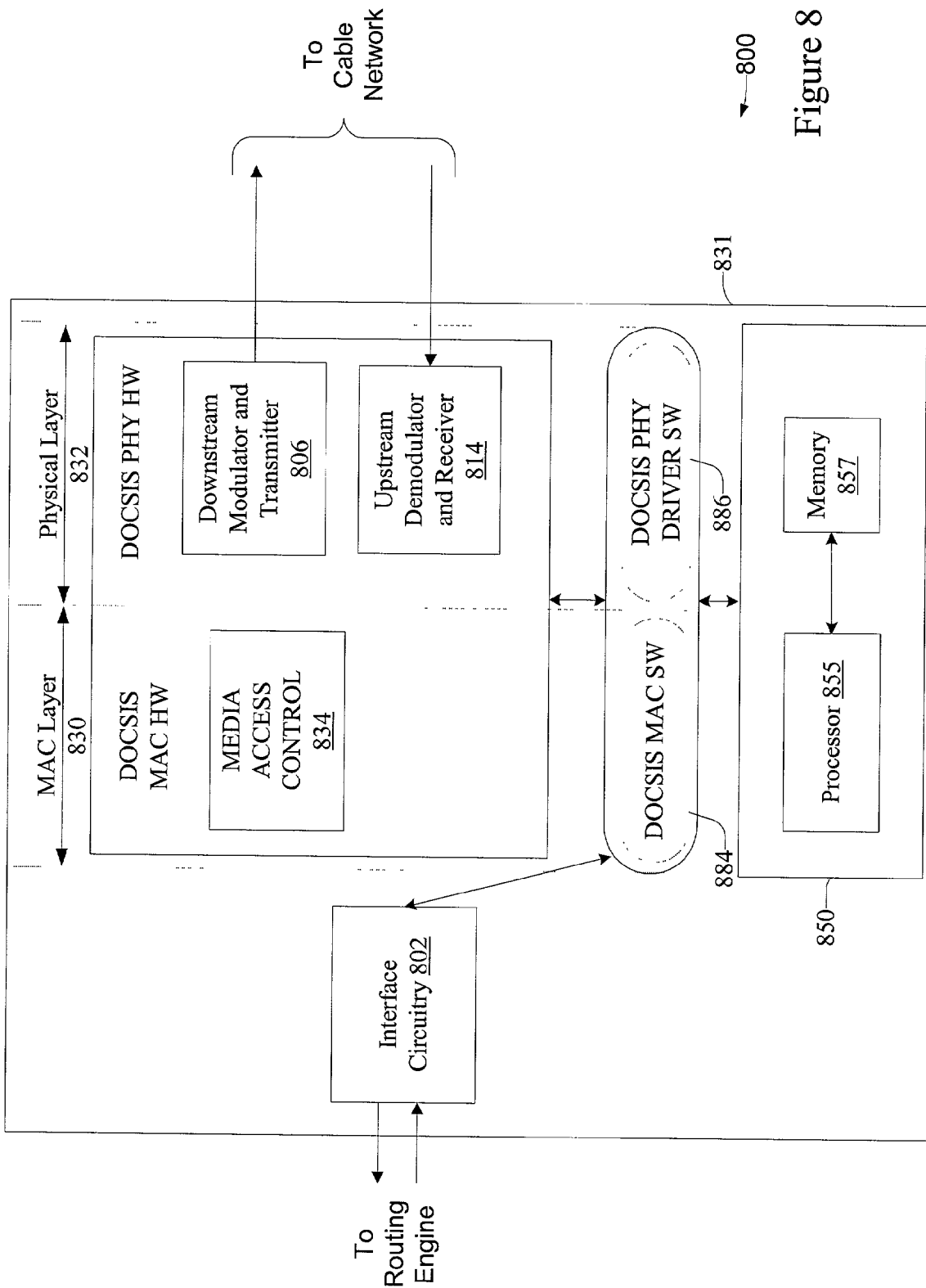
FIG. 8 shows a specific embodiment of a line card which may be used for implementing certain aspects of the present invention.

FIG. 8 shows a specific embodiment of a line card 800 which may be used for implementing certain aspects of the present invention. According to a specific embodiment, the line card 800 may be configured or designed to implement selected aspects of the DOCSIS functionality which were conventionally implemented by the CMTS, such as, for example, DOCSIS MAC functionality.

In the specific embodiment as shown in FIG. 8, line card 800 provides functions on several network layers, including a physical layer 832, and a Media Access Control (MAC) layer 830. Generally, the physical layer is responsible for receiving and transmitting RF signals on the cable plant. Hardware portions of the physical layer include at least one downstream modulator and transmitter 806 and/or at least one upstream demodulator and receiver 814. The physical layer also includes software 886 for driving the hardware components of the physical layer.

Upstream optical data signals (packets) arriving via an optical fiber node are converted to electrical signals, and then demodulated by the demodulator/receiver 814. The demodulated information is then passed to MAC layer block 830.

A primary purpose of MAC layer 830 is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information. The MAC headers include addresses to specific modems (if sent downstream), or to the CMTS (if sent upstream). Note that the cable modems also include MAC addressing components. In the cable modems, these components encapsulate upstream data with a header containing the MAC address of the CMTS.

MAC layer 830 includes a MAC hardware portion 834 and a MAC software portion 884. The MAC layer software portion may include software relating to DOCSIS MAC functionality, filtering option selection and filtering functionality, etc. The MAC layer hardware and software portions operate together to provide the above-described DOCSIS MAC functionality. In a preferred embodiment, MAC controller 834 is dedicated to performing some MAC layer functions, and is distinct from processor 855.

After MAC layer block 830 has processed the upstream information, it is then passed to interface circuitry 802. As described previously, interface circuitry 802 includes the appropriate hardware and/or software for converting data formats received at the line cards to a suitable protocol format for transmission from the line card to an appropriate routing engine.

When a packet is received from the routing engine at the interface circuitry 802, the packet is then passed to MAC layer 830. The MAC layer 830 also transmits information via a one-way communication medium to downstream modulator and transmitter 806. Downstream modulator and transmitter 806 takes the data (or other information) in a packet structure and converts it to modulated downstream frames, such as MPEG or ATM frames, on the downstream carrier using, for example, QAM64 modulation. Other methods of modulation may also be used such as, for example, QAM256 modulation, CDMA (Code Division Multiple Access), OFDM (Orthogonal Frequency Division Multiplexing), FSK (FREQ Shift Keying), etc. The return data is likewise modulated using, for example, QAM16 or QSPK. According to a specific embodiment, the modulated data is converted from IF electrical signals to RF electrical signals (or vice-versa) using one or more electrical signal converters (not shown).

As shown in FIG. 8, line card 800 includes a central hardware block 850 including one or more processors 855 and memory 857. These hardware components interact with software and other hardware portions of the various layers within the line card. They provide general purpose computing power for much of the software. Memory 857 may include, for example, I/O memory (e.g. buffers), program memory, shared memory, etc. One or more data structures used for implementing the technique of the present invention may reside in such memory. In one embodiment, the software entities 882, 884, and 886 are implemented as part of a network operating system running on hardware 850. Preferably, at least a part of the filtering functionality of this invention is implemented in software as part of the operating system. In FIG. 8, such software may be part of MAC layer software 884, or may be closely associated therewith. Of course, the filtering logic of the present invention could reside in hardware, software, or some combination of the two.

According to a specific implementation, the procedures typically employed by the CMTS during registration and pre-registration may be performed at the MAC layer of the line card 800. In such an embodiment, most of the registration operations may be performed by the hardware and software provided for MAC layer logic 830.

It will be appreciated that, according to a specific embodiments, at least a portion of functions described herein which are performed by the CMTS (e.g. FIG. 7), line cards (e.g. FIG. 8), or selected components thereof, may be implemented in a centralized CMTS system (e.g. residing at the Head End Complex of the cable network and/or may be implemented at one or more distributed CMTS (DCMTS) systems (e.g. residing at one or more fiber nodes.

Further, it will be appreciated by one having ordinary skill in the art that the technique of the present invention may be implemented in any computer network having a standardized protocol for utilizing a central termination system (e.g. Head End) to schedule timeslots for remote stations or nodes on a return (or upstream) channel. In wireless networks, the central termination system may be referred to as a Head End or wireless base station. In satellite networks, the central termination system may be referred to as a master controlling station.

Generally, the monitoring techniques (e.g., monitoring station 140) of the present invention may be implemented on software and/or hardware. That is, the filtered data may be analyzed and monitored by any suitable device. The monitoring techniques may also be implemented within the same device as the filtering techniques (e.g., the CMTS) with the filtered data being stored therein (e.g., on the CMTS). By way of other examples, the monitoring techniques can be implemented in an operating system kernel, in a separate user process, in a library package bound into network applications, on a specially constructed machine, or on a network interface card. In a specific embodiment of this invention, the monitoring techniques of the present invention is implemented in software such as an operating system or in an application running on an operating system.

A software or software/hardware hybrid implementation of the monitoring technique of this invention may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. Specific examples of such network devices include routers and switches. For example, the monitoring devices of this invention may be specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the monitoring techniques of this invention may be implemented on a general-purpose network host machine such as a personal computer or workstation. Further, the invention may be at least partially implemented on a card (e.g., an interface card) for a network device or a general-purpose computing device.

Figure 9:
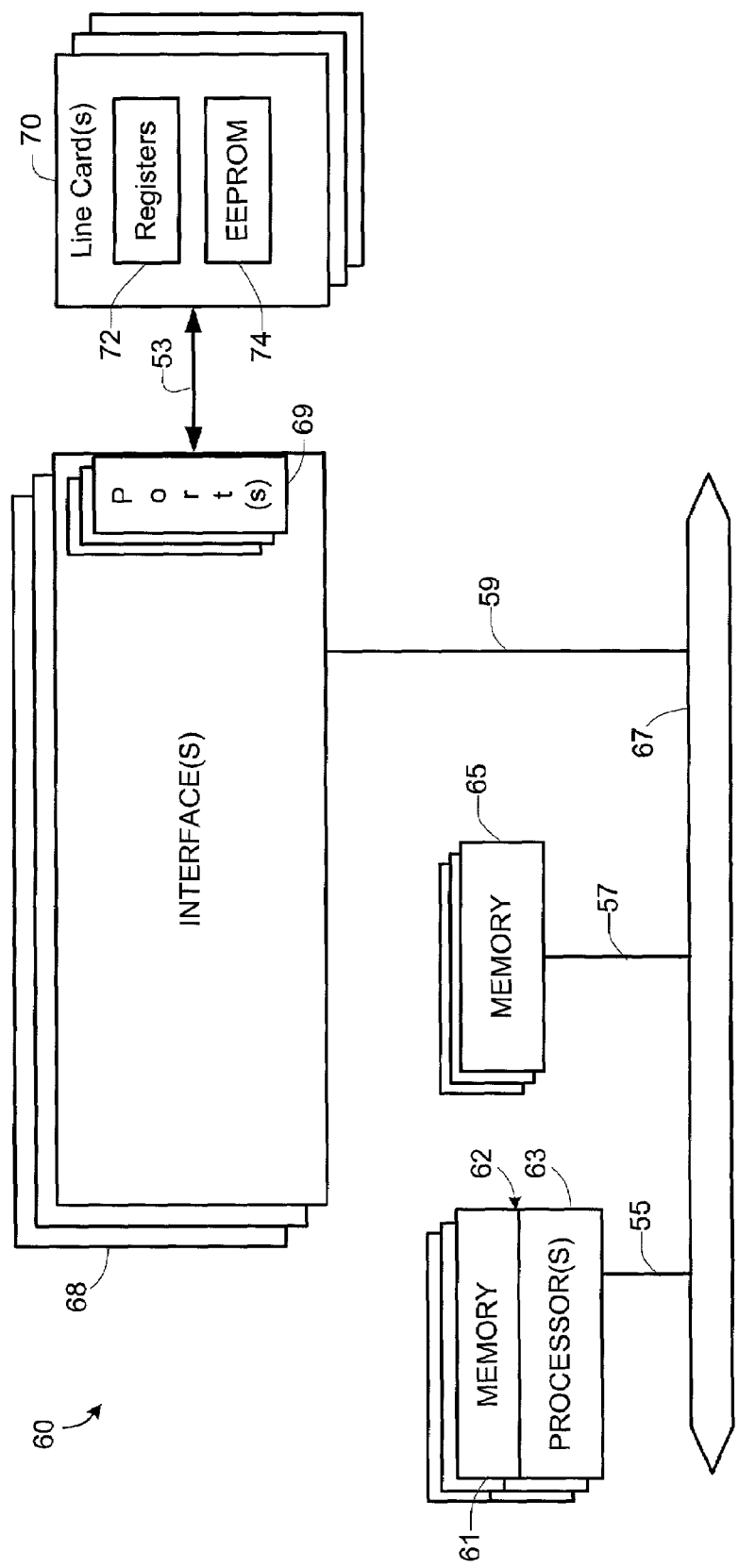
FIG. 9 is a network device suitable for implementing the monitoring techniques of the present invention.

Referring now to FIG. 9, a network device 60 suitable for implementing the monitoring techniques of the present invention includes a master central processing unit (CPU) 62, interfaces 68, and a bus 67 (e.g., a PCI bus). When acting under the control of appropriate software or firmware, the CPU 62 may be responsible for implementing specific functions associated with the functions of a desired network device. For example, when configured as a monitoring device, the CPU 62 may be responsible for analyzing packets, encapsulating packets, forwarding packets to appropriate network devices, monitoring filtered data, etc. The CPU 62 preferably accomplishes all these functions under the control of software including an operating system (e.g. Windows NT), and any appropriate applications software.

CPU 62 may include one or more processors 63 such as a processor from the Motorola family of microprocessors or the MIPS family of microprocessors. In an alternative embodiment, processor 63 is specially designed hardware for controlling the operations of network device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 9 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the monitoring techniques described herein. The program instructions may control the operation of an operating system and/or one or more applications, for example. The memory or memories may also be configured to include the filtered data, status parameters, etc.

Because such information and program instructions may be employed to implement the systems/methods described herein, the present invention relates to machine readable media that include program instructions, state information, etc. for performing various operations described herein. Examples of machine-readable media are listed above.

It will be appreciated that the techniques of the present invention are not limited to cable networks, and may be applied to any access data network which uses at least one shared access communication channel to communicate between a plurality of nodes in the network and a Head End of the network.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method for filtering messages communicated between a cable head end and one or more cable modems, the method comprising:

obtaining a message at the cable head end, wherein the message is received from one of the cable modems or is to be transmitted to one of the cable modems;

determining whether the message meets filtering criteria; and when the message meets the filtering criteria, copying the message including a payload and sending the copied message including the payload to a memory device such that the copied message including the payload is stored at the memory device;

wherein the obtaining, determining, copying and sending steps are performed by the cable head end.

2. A method as recited in claim 1, further comprising:

when the message is to be transmitted to a cable modem, forwarding the message to the cable modem; and when the message is received from a cable modem, processing the message at the cable head end.

3. A method as recited in claim 1, wherein the filtering criteria specifies a message type and the message meets the filtering criteria when the message has the specified message type.

4. A method as recited in claim 3, wherein the message type is a MAP message.

5. A method as recited in claim 4, wherein the filtering criteria further specifies one or more service identifiers and the filtering criteria is met when the message is a MAP message that contains any specified service identifier.

6. A method as recited in claim 4, wherein the filtering criteria further specifies one or more MAC addresses and the filtering criteria is met when the message is a MAP message that contains any specified MAC address.

7. A method as recited in claim 4, wherein the filtering criteria further includes an option to append a time stamp to the copied message.

8. A method as recited in claim 4, wherein the filtering criteria further includes an option to strip a MAC Management Header from the copied message.

9. A method as recited in claim 3, wherein the message type is a dynamic service message.

10. A method as recited in claim 9, wherein the filtering criteria further specifies one or more service identifiers and the filtering criteria is met when the message is a dynamic service message that contains any specified service identifier.

11. A method as recited in claim 9, wherein the filtering criteria further specifies a dynamic service message type and the filtering criteria is met when the message is a dynamic service message that contains the specified dynamic service message type.

12. A method as recited in claim 11, wherein the dynamic service message type is selected from a group consisting of a message for adding, a message for deleting, and a message for changing one or more services.

13. A method as recited in claim 9, wherein the filtering criteria further includes an option to append a time stamp to the copied message.

14. A method as recited in claim 9, wherein the filtering criteria further includes an option to strip a MAC Management Header from the copied message.

15. A method as recited in claim 1, wherein the filtering criteria specifies one or more service identifiers and the filtering criteria is met when the message contains any specified service identifier.

16. A method as recited in claim 1, wherein the filtering criteria specifies one or more MAC addresses and the filtering criteria is met when the message contains any specified MAC address.

17. A method as recited in claim 1, wherein the filtering criteria specifies one or more access control type parameters and the filtering criteria is met when the message contains any specified access control type parameter.

18. A method as recited in claim 1, wherein the filtering criteria specifies either a downstream or downstream direction and the filtering criteria is met when the message is associated with the specified direction.

19. A method as recited in claim 1, wherein the filtering criteria specifies one or more ports and the filtering criteria is met when the message is associated with any specified port.

20. A method as recited in claim 1, wherein the memory device forms part of a computer system that is accessible via a computer network.

21. The method as recited in claim 1, further comprising:
selecting the message filtering criteria.

22. The method as recited in claim 21, wherein the selecting step is performed at the cable head end.

23. The method as recited in claim 1, wherein the obtaining, determining, copying and sending steps are performed by the cable head end for messages that are received from one of the cable modems.

24. The method as recited in claim 1, wherein the obtaining, determining, copying and sending steps are performed by the cable head end for messages that are transmitted to one of the cable modems.

25. The method as recited in claim 1, wherein the obtaining, determining, copying and sending steps are performed by the cable head end for messages that are received from one of the cable modems and for messages that are transmitted to one of the cable modems.

26. The method as recited in claim 1, wherein the filtering criteria are not applied by one of the cable modems.

27. The method as recited in claim 1, wherein the message is generated by the cable head end.

28. The method as recited in claim 1, wherein the message is not generated by one of the cable modems.

29. The method as recited in claim 1, wherein the filtering criteria identifies whether the message is associated with a downstream channel.

30. The method as recited in claim 1, wherein the filtering criteria identifies whether the message is associated with an upstream channel.

31. The method as recited in claim 1, wherein when the message does not meet the filtering criteria, the copying and sending steps are not performed.

32. The method as recited in claim 1, further comprising:
receiving one or more filtering commands at the cable head end, the one or more filtering commands specifying the filtering criteria.

33. The method as recited in claim 32, wherein the one or more filtering commands indicate one or more parameters associated with the filtering criteria.

34. The method as recited in claim 1, wherein the filtering criteria are used to select messages to be copied and stored at the memory device.

35. A computer system operable to filter messages communicated between a cable head end and one or more cable modems, the computer system comprising:
one or more processors;
one or more memory, wherein at least one of the processors or the memory are adapted to:
obtain a message at the cable head end, wherein the message is received from one of the cable modems or is to be transmitted to one of the cable modems;
determine whether the message meets filtering criteria; and
when the message meets the filtering criteria, copy the message including a payload and send the copied message including the payload to a memory device such that the copied message including the payload is stored at the memory device;
wherein the obtain, determine, copy and send steps are performed by the cable head end.

36. A computer system as recited in claim 35, wherein at least one of the processors or the memory are further adapted to:
when the message is to be transmitted to a cable modem, forward the message to the cable modem; and
when the message is from a cable modem, process the message at the cable head end.

37. A computer system as recited in claim 35, wherein the filtering criteria specifies a message type and the message meets the filtering criteria when the message has the specified message type.

38. A computer system as recited in claim 37, wherein the message type is a MAP message.

39. A computer system as recited in claim 38, wherein the filtering criteria further specifies one or more service identifiers and the filtering criteria is met when the message is a MAP message that contains any specified service identifier.

40. A computer system as recited in claim 38, wherein the filtering criteria further specifies one or more MAC addresses and the filtering criteria is met when the message is a MAP message that contains any specified MAC address.

41. A computer system as recited in claim 38, wherein the filtering criteria further includes an option to append a time stamp to the copied message.

42. A computer system as recited in claim 38, wherein the filtering criteria further includes an option to strip a MAC Management Header from the copied message.

43. A computer system as recited in claim 37, wherein the message type is a dynamic service message.

44. A computer system as recited in claim 43, wherein the filtering criteria further specifies one or more service identifiers and the filtering criteria is met when the message is a dynamic service message that contains any specified service identifier.

45. A computer system as recited in claim 43, wherein the filtering criteria further specifies a dynamic service message type and the filtering criteria is met when the message is a dynamic service message that contains the specified dynamic service message type.

46. A computer system as recited in claim 45, wherein the dynamic service message type is selected from a group consisting of a message for adding, a message for deleting, and a message for changing one or more services.

47. A computer system as recited in claim 43, wherein the filtering criteria further includes an option to append a time stamp to the copied message.

48. A computer system as recited in claim 43, wherein the filtering criteria further includes an option to strip a MAC Management Header from the copied message.

49. A computer system as recited in claim 35, wherein the filtering criteria specifies one or more service identifiers and the filtering criteria is met when the message contains any specified service identifier.

50. A computer system as recited in claim 35, wherein the filtering criteria specifies one or more MAC addresses and the filtering criteria is met when the message contains any specified MAC address.

51. A computer system as recited in claim 35, wherein the filtering criteria specifies one or more access control type parameters and the filtering criteria is met when the message contains any specified access control type parameter.

52. A computer system as recited in claim 35, wherein the filtering criteria specifies either a downstream or downstream direction and the filtering criteria is met when the message is associated with the specified direction.

53. A computer system as recited in claim 35, wherein the filtering criteria specifies one or more ports and the filtering criteria is met when the message is associated with any specified port.

54. A computer system as recited in claim 35, wherein the memory device forms part of a second computer system that is separate from the first computer system and that is accessible via a computer network.

55. The computer system as recited in claim 35, wherein the memory device is coupled to the cable head end.

56. The computer system as recited in claim 35, wherein the memory device is separate from the computer system.

57. The computer system as recited in claim 35, wherein the memory device is accessible via a computer network.

58. The computer system as recited in claim 35, wherein the memory device is coupled to a monitoring station.

59. A computer readable storage medium storing thereon computer-readable instructions for filtering messages communicated between a cable head end and one or more cable modems that, when executed, cause a computer system to:
obtain a message at the cable head end, wherein the message is received from one of the cable modems or is to be transmitted to one of the cable modems;
determine whether the message meets filtering criteria; and
when the message meets the filtering criteria, copy the message including a payload and send the copied message including the payload to a memory device such that the copied message including the payload is stored at the memory device, wherein the obtain, determine, copy and send steps are performed by the cable head end.

60. A computer-readable storage medium as recited in claim 59, wherein the filtering criteria specifies a message type and the message meets the filtering criteria when the message has the specified message type.

61. A computer-readable storage medium as recited in claim 60, wherein the message type is a MAP message.

62. A computer-readable storage medium as recited in claim 61, wherein the filtering criteria further includes an option to append a time stamp to the copied message.

63. A computer-readable storage medium as recited in claim 61, wherein the filtering criteria further includes an option to strip a MAC Management Header from the copied message.

64. A computer-readable storage medium as recited in claim 60, wherein the message type is a dynamic service message.

65. A computer-readable storage medium as recited in claim 59, wherein the filtering criteria specifies one or more service identifiers and the filtering criteria is met when the message contains any specified service identifier.

66. A computer-readable storage medium as recited in claim 59, wherein the filtering criteria specifies one or more MAC addresses and the filtering criteria is met when the message contains any specified MAC address.

67. A computer-readable storage medium as recited in claim 59, wherein the filtering criteria specifies one or more access control type parameters and the filtering criteria is met when the message contains any specified access control type parameter.

68. A computer-readable storage medium as recited in claim 59, wherein the filtering criteria specifies either a downstream or downstream direction and the filtering criteria is met when the message is associated with the specified direction.

69. A computer-readable storage medium as recited in claim 59, wherein the filtering criteria specifies one or more ports and the filtering criteria is met when the message is associated with any specified port.

70. A computer-readable storage medium as recited in claim 59, wherein the memory device forms part of a computer system that is accessible via a computer network.

71. An apparatus for filtering messages communicated between a cable head end and one or more cable modems, the apparatus comprising:

means for obtaining a message at the cable head end, wherein the message is received from one of the cable modems or is to be transmitted to one of the cable modems;
means for determining whether the message meets filtering criteria; and
means for copying the message including a payload and sending the copied message including the payload to a memory device when the received message meets the filtering criteria such that the copied message including the payload is stored at the memory device, wherein the obtaining, determining, copying and sending steps are performed by the cable head end.

* * * * *

UNITED STATES PATENT AND TRADEMARK OFFICE
CERTIFICATE OF CORRECTION

PATENT NO.        : 7,656,877 B1                                         Page 1 of 1
APPLICATION NO. : 09/935238
DATED             : February 2, 2010
INVENTOR(S)       : Sharan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1084 days.

Signed and Sealed this

Twenty-eighth Day of December, 2010

David J. Kappos
*Director of the United States Patent and Trademark Office*